UNITED STATES PATENT OFFICE

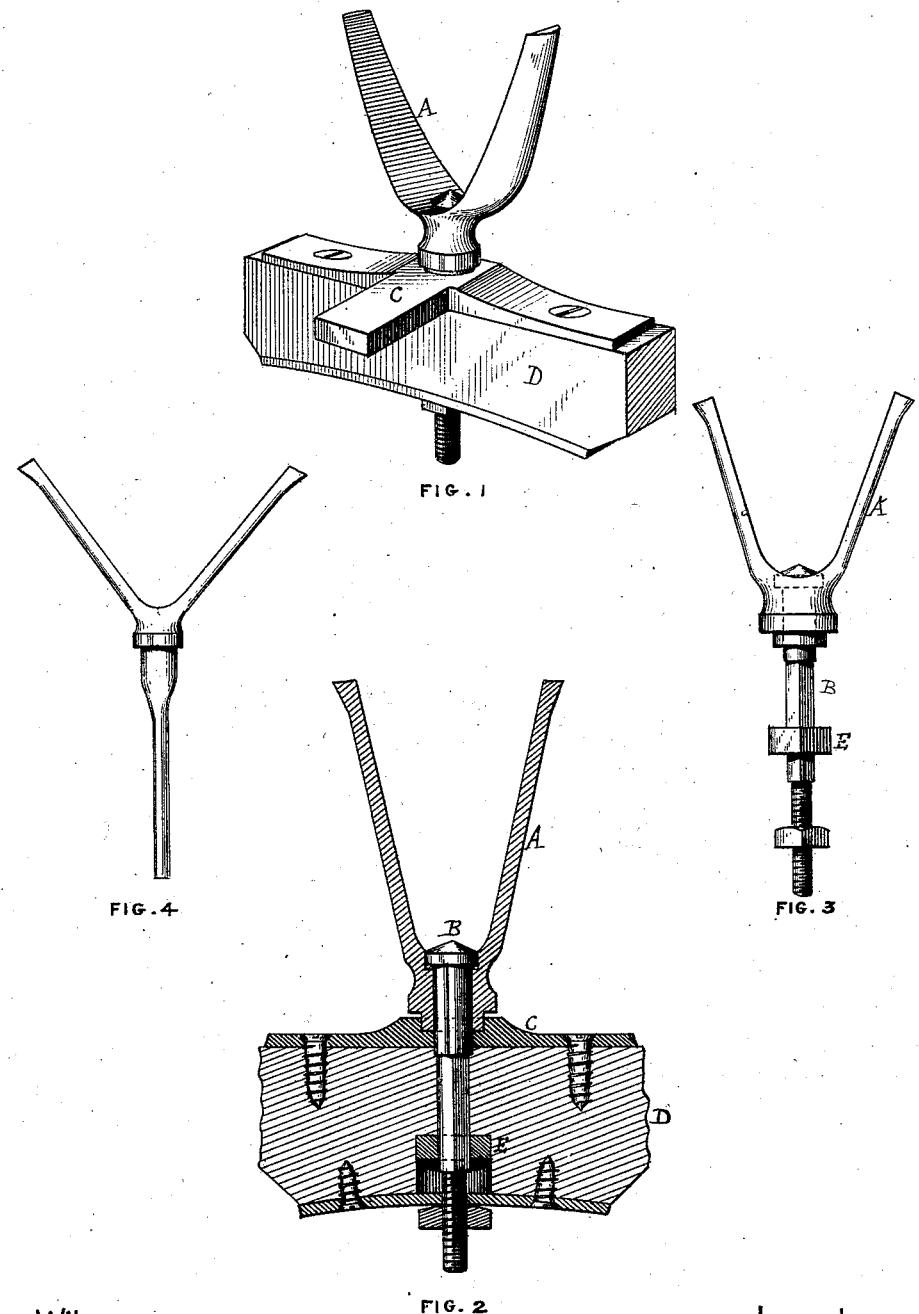

LEVI PENTZ, OF CANTON, OHIO.

IMPROVEMENT IN CLIP KING-BOLTS.

Specification forming part of Letters Patent No. 221,184, dated November 4, 1879; application filed September 20, 1879.

*To all whom it may concern:*

Be it known that I, LEVI PENTZ, of Canton, in the county of Stark and State of Ohio, have invented certain new and useful Improvements in Clip King-Bolts for Carriages and Wagons, which improvements are fully set forth in the following specification, reference being had to the accompanying drawings.

The object of my invention is to allow the clip of the bolt in which the axle rests to turn readily on the bolt, the two being made separately, and also to prevent breakage at the shoulder formed by the collar when under tension.

In the drawings, Figure 1 is a front view of the king-bolt set in position on the T-plate and head-block. Fig. 2 is a transverse section of the same. Fig. 3 is a front view of the king-bolt, showing the clip with its collar or shoulder, the bolt proper, and the washer or nut beneath the T-plate, which holds the bolt steady and prevents it from turning while the clip revolves upon it. Fig. 4 is a front view of an ordinary clip king-bolt.

In the construction of my improved clip king-bolt the clip A is forged separately from the bolt, and is provided at its base with a shoulder or collar; and a round hole of two diameters, the upper one smaller than the lower, so as to form a shoulder on the latter, is drilled vertically through its center, in which the bolt revolves.

The bolt B is formed with a conical-shaped head, which rests on the shoulder in the hole in the center of the clip. The portion of the bolt beneath the head must be round, the length only of the shoulder or collar of the clip, and the thickness of the T-plate C, on which it rests, this portion of the bolt being round, in order that the clip may revolve or turn upon it.

The lower portion of the bolt, which is inclosed within the head-block D, must be triangular, square, or polygonal in shape, in order that it may be fitted into the stationary washer or nut E, of corresponding shape, inserted in the head-block, and so be held firmly rigid, while the clip revolves or turns upon the bolt around its upper rounded portion.

In fastening the bolt to the head-block, the carriage-builder will turn a screw-thread on the end of the bolt which passes through and projects beyond the under side of the head-block, and a nut is screwed upon this end of the bolt to fasten the whole device and hold it in position.

I deem it advantageous to place a leather washer on the shoulder formed by the round hole of large diameter in the center of the clip, to prevent the wear of the head of the bolt on the shoulder; and I also add, for a similar purpose, a leather washer in the hole of the T-plate, to prevent wear of the base of the shoulder or collar of the clip, which rests upon and partly revolves within the T-plate.

I have shown in Fig. 4 of the drawings an ordinary clip king-bolt in order, by comparison, to show more clearly the advantages of my improvements.

With the ordinary clip king-bolt, of which the clip and the bolt are forged in one piece, there is a constant danger of the bolt breaking at the shoulder formed by the collar when under tension.

With my improved clip king-bolt this is impossible, because there is no tension or strain at this point, the clip and the bolt being made separately, and the former revolving upon the latter; and this is the principal feature of my improved clip king-bolt, because, in addition to the advantage already mentioned, the bolt turns easily in the clip without binding or strain; and, furthermore, the conical-shaped head of the bolt proper, which sets in the axle-bed, keeps the clip from slipping, which frequently occurs in the use of ordinary clip king-bolts.

Having thus described my invention, what I claim, and desire to secure by Letters Patent, is—

A clip king-bolt for carriages and wagons, consisting of the combination of the clip A, provided with a shoulder or collar with a central hole or opening of two diameters, the bolt B, having a conical-shaped head, and rounded at its upper end, and square, triangular, or polygonal at its lower end, and the washer or nut C, to fit said lower end of the bolt, the whole being constructed and operating substantially as and for the purpose set forth.

In witness whereof I have signed my name to this specification in the presence of two subscribing witnesses.

LEVI PENTZ.

Witnesses:
LUTHER R. HICKS,
JOHN LAHM.